United States Patent [19]
Blair et al.

[11] Patent Number: 5,239,464
[45] Date of Patent: Aug. 24, 1993

[54] INTERACTIVE VIDEO SYSTEM PROVIDING REPEATED SWITCHING OF MULTIPLE TRACKS OF ACTIONS SEQUENCES

[76] Inventors: Preston E. Blair, 3465 Crestline Way, Soquel, Calif. 95073; Frank S. Preston, 413 Hempstead Rd., Williamsburg, Va. 23188

[21] Appl. No.: 805,273

[22] Filed: Dec. 9, 1991

Related U.S. Application Data

[60] Division of Ser. No. 442,230, Nov. 28, 1989, Pat. No. 5,174,759, which is a continuation-in-part of Ser. No. 228,946, Aug. 4, 1988, abandoned.

[51] Int. Cl.$^5$ ............................................. C06F 15/44
[52] U.S. Cl. .................................................... 364/410
[58] Field of Search ....... 364/410; 273/856, DIG. 28, 273/316; 434/307-309

[56] References Cited

U.S. PATENT DOCUMENTS

Re. 33,662 8/1991 Blair et al. ........................... 364/410

Primary Examiner—Gail O. Hayes
Attorney, Agent, or Firm—Davis & Schroeder

[57] ABSTRACT

An improved video system that enables a player to interact with mid-air stereo perception images of foreshortened perspective animation and with animation displayed on the projection screen or monitor, by controlling the motions of a robotic simulation apparatus deployed in front of the projection screen. The robotic apparatus is controlled by commands issued by the player and by feedback information from the animation. The mid-air coordinates of transducers installed on the robotic apparatus, which could be a vehicle or a gun, for example, are calculated using a geometric method to determine the coordinates of a point on the displayed animation aimed or steered at by the gun or vehicle. Animation location coordinates coded in the tracks are then compared to the coordinates of said point and the animation responds accordingly.

10 Claims, 8 Drawing Sheets

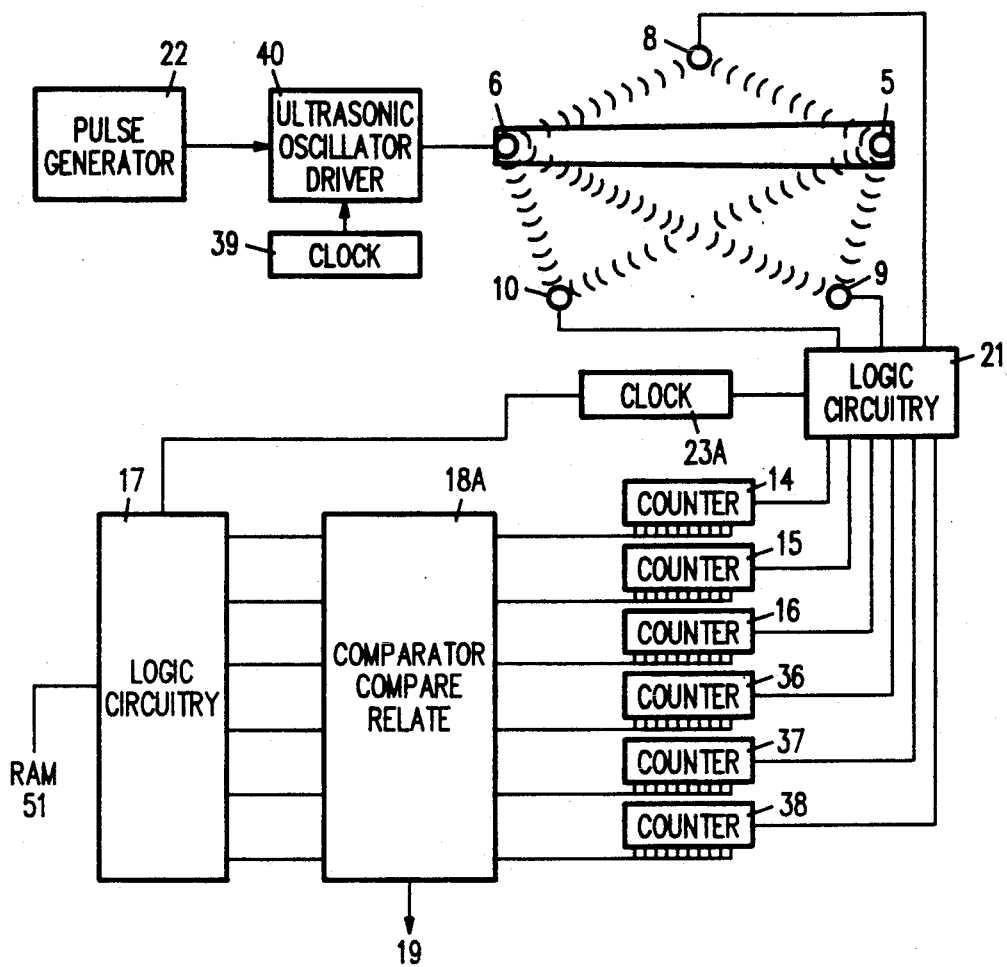
FIG. 10
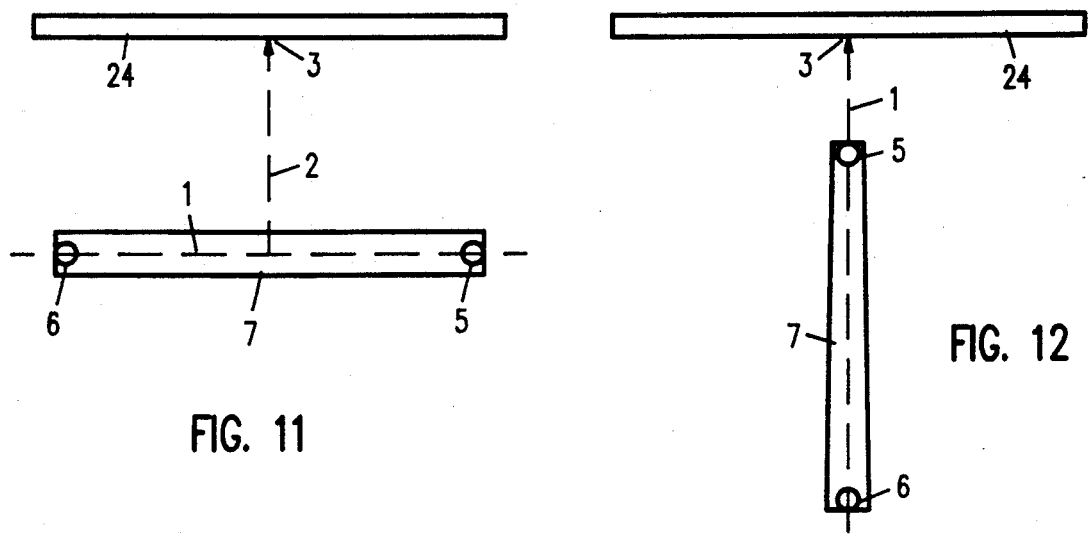
FIG. 11
FIG. 12

INTERACTIVE VIDEO SYSTEM PROVIDING REPEATED SWITCHING OF MULTIPLE TRACKS OF ACTIONS SEQUENCES

CROSS REFERENCE TO RELATED APPLICATION

This application is a divisional application of Ser. No. 07/442,230, filed Nov. 28, 1989 now U.S. Pat. No. 5,174,759 which is a continuation-in-part of application Ser. No. 07/228,946, filed Aug. 4, 1988 now abandoned.

BACKGROUND OF THE INVENTION

The present invention relates generally to interactive video systems and to improvements in U.S. Pat. Nos. 4,695,953 and 4,711,543 entitled TV Animation Interactively Controlled by the Viewer. More particularly, the present invention relates to a method and apparatus wherein a viewer dynamically interacts with an animated video presentation to control action sequences and enable rapid and repeated switching of multiple tracks of recorded data representing different actions while retaining a continuous action sequence, and enable branching at the termination of an action sequence by effecting track rewind.

U.S. Pat. No. 4,695,953 teaches a double-circuit video system that in one embodiment enables a player to repeatedly touch or hit an animated character during a continuous action scene as displayed on a projection screen or video monitor and thus change the action repeatedly. Another embodiment enables a player to swing a racket before the screen or video monitor, hit the mid-air projected image of a perspective ball animated action, return the ball back to the animated character opponent, and play a simulated game during which the player exercises the same skill used to play the game simulated. An ultrasonic transducer in a playing instrument and a microphone combination disposed on the video monitor face or at angles to the playing action permits the calculation of a signal representing the monitor contact position or the mid-air position of the playing instrument action relating to the game. The signal thus calculated is compared to a similar representation of the position of the character or object in the associated frame of the animation displayed by the video monitor and digitally coded on tape or disc.

U.S. Pat. No. 4,711,543 teaches a method of animation to provide smooth animation displayed on the video monitor of a continuous action scene during rapid and repeated switching of multiple tracks of data representing different animation action sequences.

While the interactive video systems disclosed by the above-cited U.S. patents admirably fulfill the roles of educational and amusement systems, it is a primary objective of the present invention to extend the capabilities and effectiveness of such systems.

SUMMARY OF THE INVENTION

The present invention provides an improvement of the interactive video system disclosed in U.S. Pat. Nos. 4,695,953 and 4,711,543. The improvement provides a robotic apparatus which may be simultaneously controlled by both a player and by feedback information generated from animation displayed on a video screen. The robotic apparatus, which may be a vehicle or a gun, for example, can be directed or aimed at a point or location on the video screen to effect a related dramatic change in the animation display and to respond to said displayed animation.

Control of the robotic apparatus is achieved by ultrasonic transducers positioned on the robotic apparatus, and by a microphone combination positioned so as to produce a readout signal relating the position of the robotic apparatus to a set of coordinates related to the point or location in the animation that the robotic apparatus is directed or aimed at. A comparison of said readout signal to a location marker stored in the frame of animation for an animated character or object, provides a means for effecting the course of the animation in response to the actions of the robotic apparatus.

BRIEF DESCRIPTION OF THE DRAWING

The invention will be more fully comprehended from the following detailed description and accompanying drawing in which:

FIG. 10 is a functional block diagram of an alternate input circuit and indicator apparatus incorporating ultrasonic transducers to the system shown in FIG. 1.

FIG. 11 diagrams a line projected from the centerpoint and normal to a projected line between the transducers of the modular indicator apparatus shown in FIG. 10.

FIG. 12 diagrams a line projected through the transducers of the modular indicator apparatus shown in FIG. 10 intersecting a video monitor screen.

DETAILED DESCRIPTION OF THE PREFERRED EMBODIMENT

Figure 1:
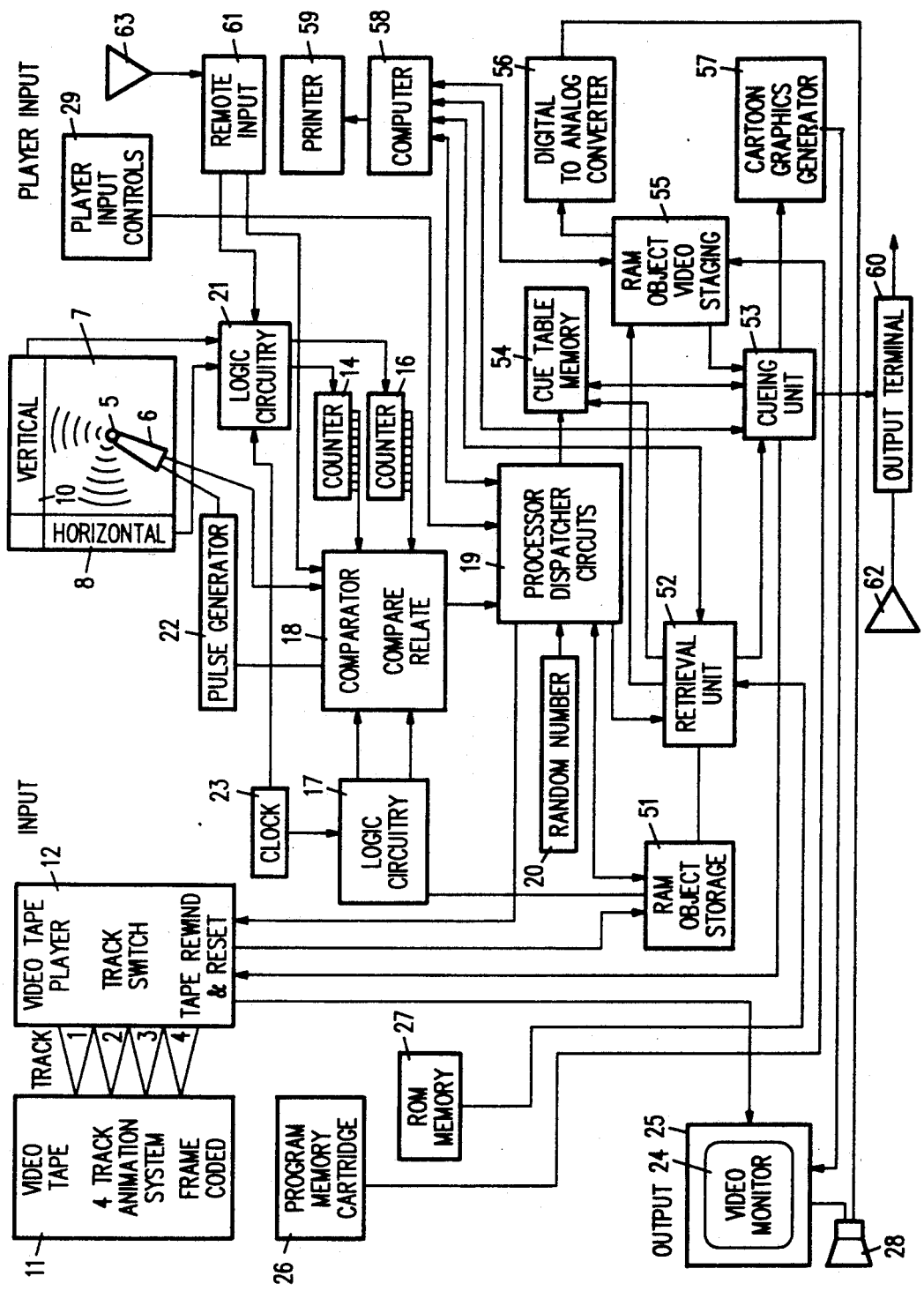
FIG. 1 is a schematic block diagram showing one embodiment of the present invention using a video-tape and a video-tape reader for the primary circuit and a secondary circuit of digitally produced animation which may be used for scoring and diagram scenes.

Referring to FIG. 1, there is shown a block diagram of the invention educational and amusement video system as a combination of two different types of videogame circuits. The details and functions of the circuits shown in FIG. 1 are more fully described in U.S. Pat. Nos. 4,695,953 and 4,711,543 hereby incorporated by reference as if fully set forth herein. The primary circuit provides operational control of the system and incorporates camera-originated motion pictures with audio as supplied in this embodiment by video tape 11 and video tape player 12. A secondary circuit incorporates digitally produced or stored animation, a user controlled computer 58, a printer 59 and a multi-function output terminal 60.

The two strip microphones 8 and 10 are responsive to the ultrasonic pulses produced by instrument 6. These microphones, in conjunction with clock 23, counters 14 and 16, and logic circuitry 21, measure the time delay for airborne propagation between the radiation of a pulse at instrument 6 and its arrival at the respective microphones 8 and 10. Logic circuitry 21 combines the outputs from microphones 8 and 10, pulse generator 22 and clock 23 to control counters 14 and 16 which count or measure the time delays. The measured time delays establish the coordinates of the location of contact tip 5 on the surface of book page 7 at the time of any particular pulse output. The application of this known ultrasonic method to detecting locations that are compared to coded animation locations to effect the course of animation is unique and unknown.

The comparator circuit 18 of FIG. 1 compares the two field coordinates derived from the digital readouts of counters 14 and 16 to the two coordinates of the field and page 7 location of graphics locations from logic circuitry 17 and RAM 51. The comparator 18 instructs the processor circuit 19 if specific field coordinates coincide. Based on this data an order is dispatched to the system primary or secondary circuit to provide specific animation. If such order is dispatched by processor 19 to the primary circuit, the order is dispatched to video tape player 12 which switches between a plurality of tracks, indicated in this embodiment as 1, 2, 3, and 4, based on the program of the episode and track instructions from program memory cartridge 26, RAM 55, and cueing (cuing) unit 53. Or, the video tape player 12 may rewind to a position in the tracks, based on said program. If such order is dispatched to the secondary circuit, the processor 19 dispatches an order to cueing unit 53 via cue table memory 54.

Referring to FIG. 1, the secondary circuit animation and graphics is generated by cartoon graphics generator 57 from digital data which may be read along with digitalized audio from ROM memory 27 or other mass-storage device. Retrieval unit 52 is a conventional peripheral input reader-controller which transfers into memory the digitally coded blocks of information obtained from ROM memory 27. This information includes control data which retrieval unit 52 stores into random access memory (RAM) 51 for use by dispatcher unit 19, and audio and/or graphics data which unit 52 stores into RAM 55 for use by cueing unit 53. The control data includes cue commands and schedule commands. Cue commands specify short term operation during an interval of time, while schedule commands represent longer term points of time, and form chains which define and relate to alternate (multiple track) schedule. Dispatcher 19 controls the course of the animation or graphics display, audio, and stores cue commands into cue table 54. Cueing unit 53 executes the cue commands. Cueing unit 53 repeatedly scans cue table 54 to get commands telling it what to do and the time it should be done. Dispatcher unit 19 may request successive blocks of control information from retrieval unit 52 and output into cue table memory 54 a schedule (called a cue table) of operations for cueing unit 53. Dispatcher 19 repeatedly updates the cue table schedule as the animation progresses. Dispatcher 19 processes the various optional player input controls 29 which may input via conventional video game playing instruments and stores the different player commands into cue table 54.

As described, dispatcher 19 controls the course of the animation and stores cue commands into cue table 54. Cueing unit 53 executes the cue commands at the times specified therein by conveying to the cartoon graphics generator circuit 57 blocks of binary-coded data previously stored into RAM 55 by retrieval unit 52, and these blocks of data are used by the cartoon graphics generator 57 to generate animation frames which are then displayed on television monitor 25. Digital audio passes from ROM memory 27 through retrieval unit 52 to memory 55 to digital to analog converter 56 and hence to system speaker 28. The binary coded data stored into RAM 55 is reinforced by individual page or game data supplied by program memory cartridge 26.

The primary multiple track video tape animation circuit, which is diagrammed in FIG. 1, is operated and scheduled by the processor dispatcher 19 which has control of the course of the camera-originated animation. The comparator 18 furnishes the results of the player's action to the processor 19 which instructs the switching of multiple tracks 1, 2, 3, and 4 with game or sequence position to video tape player 12. At the termination of a game or sequence either random number generator 20, player input 29, or the placement of instrument 6 on page book 7 specifies an episode to processor 19 which instructs tape player 12 of the rewind.

The operation of both the primary and secondary animation circuits is controlled by processor 19 based on data from program memory 26 and ROM memory 27 and the operation of the secondary circuit retrieval, cueing, and memory circuits as described above. As ordered by processor 19, this instruction is sent to tape player 12 or cartoon graphics generator 57 by cueing unit 53. The digital memory cartridge 26 can be various types of memory and may be plugged in to change the scenario, provide digital data for each book page 7, or to replace video/audio means 11 and 12 and supply the coded animation used by the system.

Figure 2:
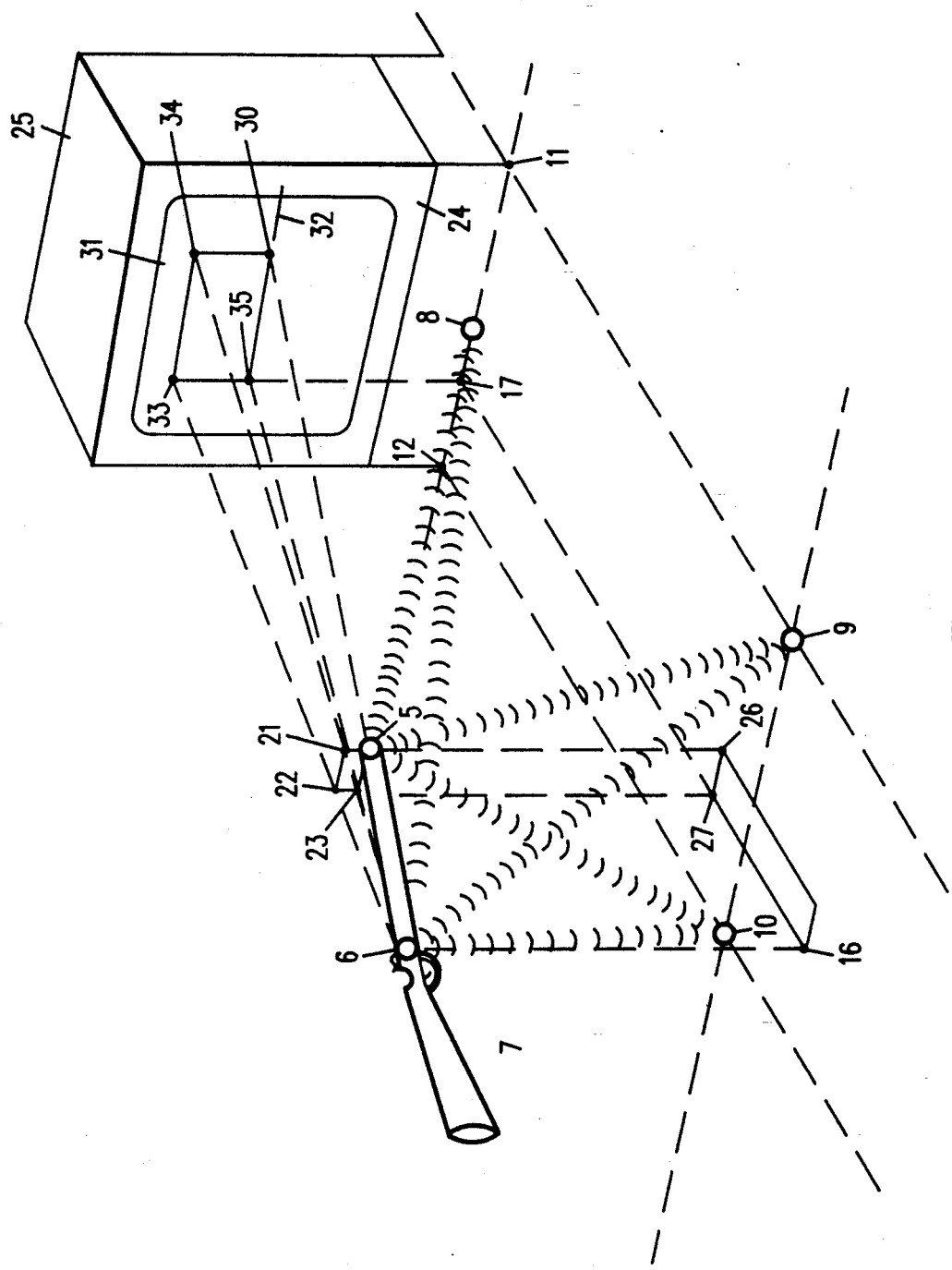
FIG. 2 is a diagram in perspective showing the placement of discrete point microphones in a pyramid array with sonic transducers installed in a rifle simulation before a video monitor illustrating another embodiment of the present invention.

Referring to FIG. 2, there is shown a drawing of a simulated rifle aimed at the face of a video monitor 24, or at a motion picture projection screen. When the rifle is aimed and triggered the invention calculates the precise point on the video monitor 24, or projection screen, whereto the rifle barrel 6 to 5 is aimed. Accordingly, the rifle embodiment is unique by instantly producing the coordinates of the point of aim on the screen. The usual firing of a missile, emission of light rays, or the manipulation of video monitor circuitry to effect a sliding cursor into the target all become extraneous and not intrinsic to the simulation process. Thus the gun embodiment may be used on large projection screens and incorporate large weaponry. The use of large projection screens also heightens the sense of reality by enlarging the target area. Transducers 6 and 5 working with point microphones 8, 9, and 10 permit the accurate determination of position and aiming direction of the rifle 7 relative to the screen 24. The calculation of the aiming spot may be done using various systems. The rifle may be aimed at specific points on the screen in the set-up mode to implement the initial condition measurements. Using rectangular coordinates, the positions may be calculated by ratios. As an example, Distance 33-31 is equal to Distance 22-21 multiplied by the ratio of Distance 6-33 to Distance 6-22. The various ratios may be organized to use only the directly measured values converted into their vertical and horizontal components. If the rifle 7 is fixed relative to the screen, these ratios may be fixed and the computation simplified by storing the pre-calculated fixed terms. (Calculation can avoid division and use faster multiplication if instead of dividing by some number, its reciprocal is calculated, stored, and used as a multiplier.)

In this manner, all the other required distances to locate the aiming spot on the screen 24 can be calculated. Accordingly, there are improved elegant methods that use less computer power that are an advance of the simple geometric method as follows: Ultrasonic transducers 6 and 5 are installed at the extremities of the rifle barrel at the sighting position 6 and at the point of the rifle barrel 5. These transducers alternatingly emit impulses to the point microphones 8, 9, and 10 which are installed at equal distances from the base points 11 and 12 of monitor 25 on lines at right angles to said base line 11-12 and at the center of base line 11-12. A readout of said impulses by microphones 8, 9, 10 establishes the coordinates of transducers 6 and 5. The vertical elevation line of transducer 6 to floor point 16 is calculated for length and position of floor point 16. The length of line 16-17, intersecting base line 11-12 at right angles, is calculated to obtain the length of comparable parallel line 6 to 33. The vertical elevation line of transducer 5 to floor point 26 is calculated for length and position of floor point 26. The vertical difference of point 6 to point 5 establishes point 21. The distance from transducer 5 vertical line base 26 to transducer 6 vertical elevation line base 16 to 17 line is calculated to obtain comparable parallel distance 5 to 23. The distance of 6 to 21 is calculated from the right angle triangle 6-5-21 using the known measurements of 6 to 5 and 5 to 21. The known distance 6 to 21 is, then, used with the known distance 21 to 22 in the right angle triangle 6-21-22 to establish the distance of 6 to 22. The distance of 6 to 33 is divided by the distance of 6 to 22, and the resulting divisor is multiplied by the distance 21 to 22 to establish the distance 33 to 31. The said divisor is, then, multiplied by the distance of 22 to 23 to establish the distance of 33 to 35. The point on the video monitor screen 24, or projection screen, at which the rifle 7 is aimed is established by a vertical measurement of the known 33 to 35 distance to point 30, and the horizontal measurement of the known 33 to 31 distance to point 30. Said aimed "hit" position 30 is then compared to the target position of the animated object or character displayed by the video monitor 25 and digitally coded in the video tape or disc. The course of the animation is then changed according to the accuracy of the rifleman. The animation, if "hit", reacts with sound during continuous action. Other animation embodiments may include target scoring, instruction, or game graphics. The rifle simulation effect is enhanced by mechanical spring or electronic means causing the rifle to "kick" on being triggered to a degree simulating reality.

Figure 3:
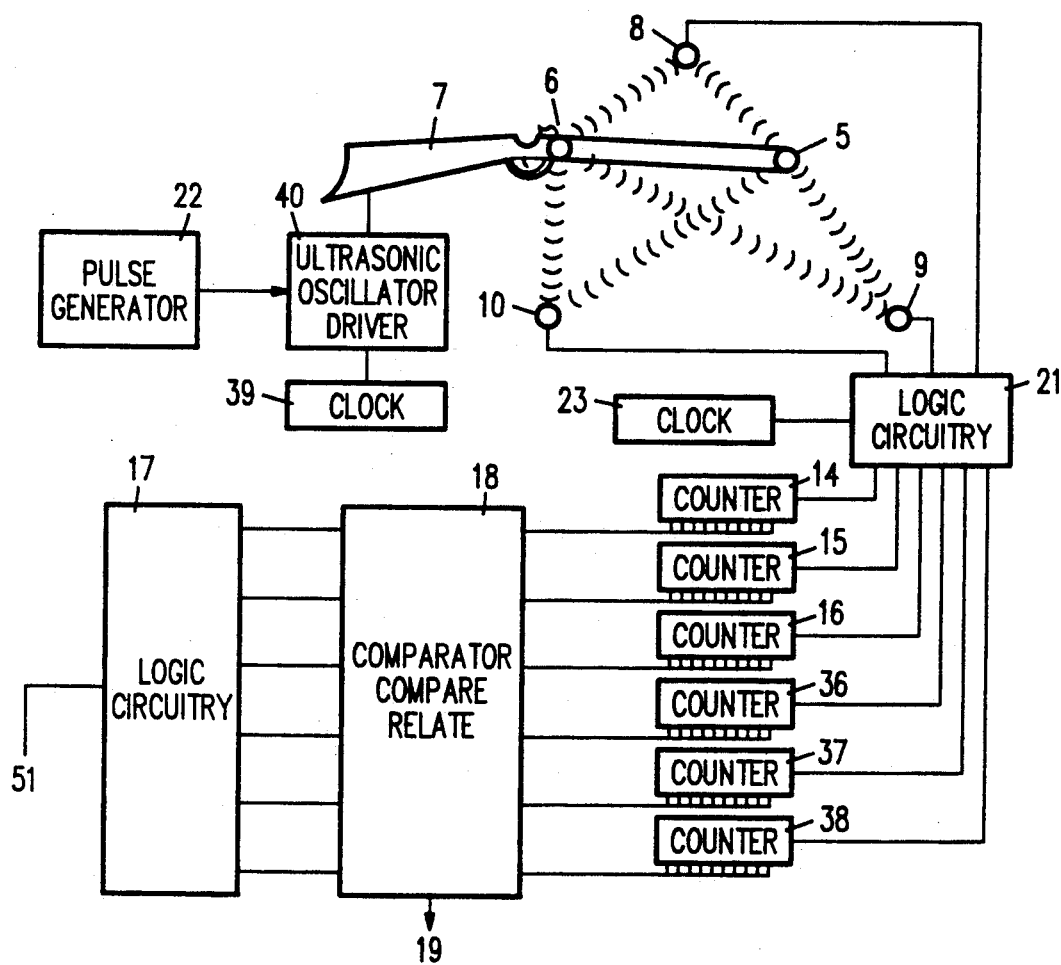
FIG. 3 is a functional block diagram of an alternate circuit of FIG. 1 implementing the system shown in FIG. 2.

Referring now also to FIG. 3, a functional block diagram of the rifle embodiment circuit which may be incorporated in the system double circuit of FIG. 1 is shown. The rifle 7 is a portable battery operated ultrasonic generator module. The generator module includes ultrasonic transducers 5 and 6 for emitting ultrasonic pulses. The transducers are driven by an ultrasonic oscillator keyed to produce pulses of ultrasonic energy at a fixed repetitive rate. A crystal controlled time base synchronizes the frequency, pulse width, and repetitive rate of the pulses. Transducers 5 and 6 each produce a pulse signal differing in pulse width and frequency. Accordingly rifle module 7 produces alternating pulses of two different types, one type emitted by transducer 5, and another type emitted by transducer 6. Point microphones 8, 9, and 10 detect the ultrasonic energy emitted by generator module rifle 7. Logic circuitry 21 recognizes the designation of each alternating type pulse by the pulse width and frequency. Accordingly, logic circuitry 21 divides the three pulses of the microphones 8, 9, and 10 to become six pulse signals to measure the three coordinates for each transducer 5 and 6. Counters 14, 15, 16, 36, 37, 38 convert the pulse data to digital form to be compared by comparator 18 to digitally coded animation location data.

This comparison is used to determine a specific track of multiple tracks of animation, to determine a specific tape/disk position to rewind thereto according to the primary circuit of FIG. 1, or to determine specific prerecorded digital animation for display or to produce digital animation according to the secondary circuit of FIG. 1. The multiple tracks of animation of video tape or disk 11 of FIG. 1, are camera-originated using the full theatrical-type animation production process or live action motion picture production optically retimed or analyzed for each frame's action and based on a frame exposure schedule sheet similar to an animator's exposure sheet, and whereon specific frames are digitally coded for animation image screen location coordinates. The above described camera-originated animation may be replaced by prerecorded digital animation obtained from ROM 27, or digital animation produced to fit the requirements of the system by cartoon graphics generator 57.

The animator's field positions of the graphics is entered by the animator on specific frames of the production exposure sheet that instructs the exposure of those drawings that detail graphic positions. Such locations per frame are converted to digital binary coordinates. The motion picture frames are counted, specified, and used to enter a table of values holding these graphic positions and vital data on the tape or disc at the beginning of each episode of the animation. All of these numbers are stored in the circuit RAM 51 of FIG. 1 and retrieved when applicable to the animation display. The frame number is recorded at intervals on the video tape track 11 and used as a track guide. Special track coding allows fast rewinds to specific frames located from track signals. Referring to FIG. 1, the coded field positions with frame numbers are stored by player 12 from tape or disc 11 into RAM 51 at the beginning of each page episode. This table of values in RAM 51 supplies pertinent data to logic circuitry 17 on time to be compared to the relevant coordinates.

The comparator circuit 18 of FIG. 1 compares the coordinates derived from the digital readouts of counters 14 and 16 to the coordinates of the graphics locations from logic circuitry 17 and RAM 51. The comparator 18 instructs the processor circuit 19 if specific field coordinates coincide. Based on this data an order is dispatched to the system primary or secondary circuit to provide specific animation. If such order is dispatched by processor 19 to the primary circuit, the order is dispatched to video tape player 12 which switches between a plurality of tracks, indicated in this embodiment as 1, 2, 3, and 4, based on the program of the episode and track instructions from program memory cartridge 26, RAM 55, and cueing (cuing) unit 53. Or, the video tape player 12 may rewind to a position in the tracks, based on said program. If such order is dispatched to the secondary circuit, the processor 19 dispatches an order to cueing unit 53 via cue table memory 54.

Referring to FIG. 1, the secondary circuit animation and graphics is generated by cartoon graphics generator 57 from digital data which may be read along with digitalized audio from ROM memory 27 or other mass-storage device. Retrieval unit 52 is a conventional peripheral input reader-controller which transfers into memory the digitally coded blocks of information obtained from ROM memory 27. This information includes control data which retrieval unit 52 stores into random access memory (RAM) 51 for use by dispatcher unit 19, and audio and/or graphics data which unit 52 stores into RAM 55 for use by cueing unit 53. The control data includes cue commands and schedule commands. Cue commands specify short term operation during an interval of time, while schedule commands represent longer term points of time, and form chains which define and relate to alternate (multiple track) schedule. Dispatcher 19 controls the course of the animation or graphics display, audio, and stores cue commands into cue table 54. Cueing unit 53 executes the cue commands. Cueing unit 53 repeatedly scans cue table 54 to get commands telling it what to do and the time it should be done. Dispatcher unit 19 may request successive blocks of control information from retrieval unit 52 and output into cue table memory 54 a schedule (called a cue table) of operations for cueing unit 53. Dispatcher 19 repeatedly updates the cue table schedule as the animation progresses. Dispatcher 19 processes the various optional player input controls 29 which may input via conventional video game playing instruments and stores the different player commands into cue table 54.

As described, dispatcher 19 controls the course of the animation and stores cue commands into cue table 54. Cueing unit 53 executes the cue commands at the times specified therein by conveying to the cartoon graphics generator circuit 57 blocks of binary-coded data previously stored into RAM 55 by retrieval unit 52, and these blocks of data are used by the cartoon graphics generator 57 to generate animation frames which are then displayed on television monitor 25. Digital audio passes from ROM memory 27 through retrieval unit 52 to memory 55 to digital to analog converter 56 and hence to system speaker 28. The binary coded data stored into RAM 55 is reinforced by game data supplied by program memory cartridge 26.

The primary multiple track video tape animation circuit, which is diagrammed in FIG. 1, is operated and scheduled by the processor dispatcher 19 which has control of the course of the camera-originated animation. The comparator 18 furnishes the results of the player's action to the processor 19 which instructs the switching of multiple tracks 1, 2, 3, and 4 with game or sequence position to video tape player 12. At the termination of a game or sequence either random number generator 20, or player input 29, specifies an episode to processor 19 which instructs tape player 12 of the rewind.

The operation of both the primary and secondary animation circuits is controlled by processor 19 based on data from program memory 26 and ROM memory 27 and the operation of the secondary circuit retrieval, cueing, and memory circuits as described above. As ordered by processor 19, this instruction is sent to tape player 12 or cartoon graphics generator 57 by cueing unit 53. The digital memory cartridge 26 can be various types of memory and may be plugged in to change the scenario, provide digital data for each book page 7, or to replace video/audio means 11 and 12 and supply the coded animation used by the system.

Figure 4:
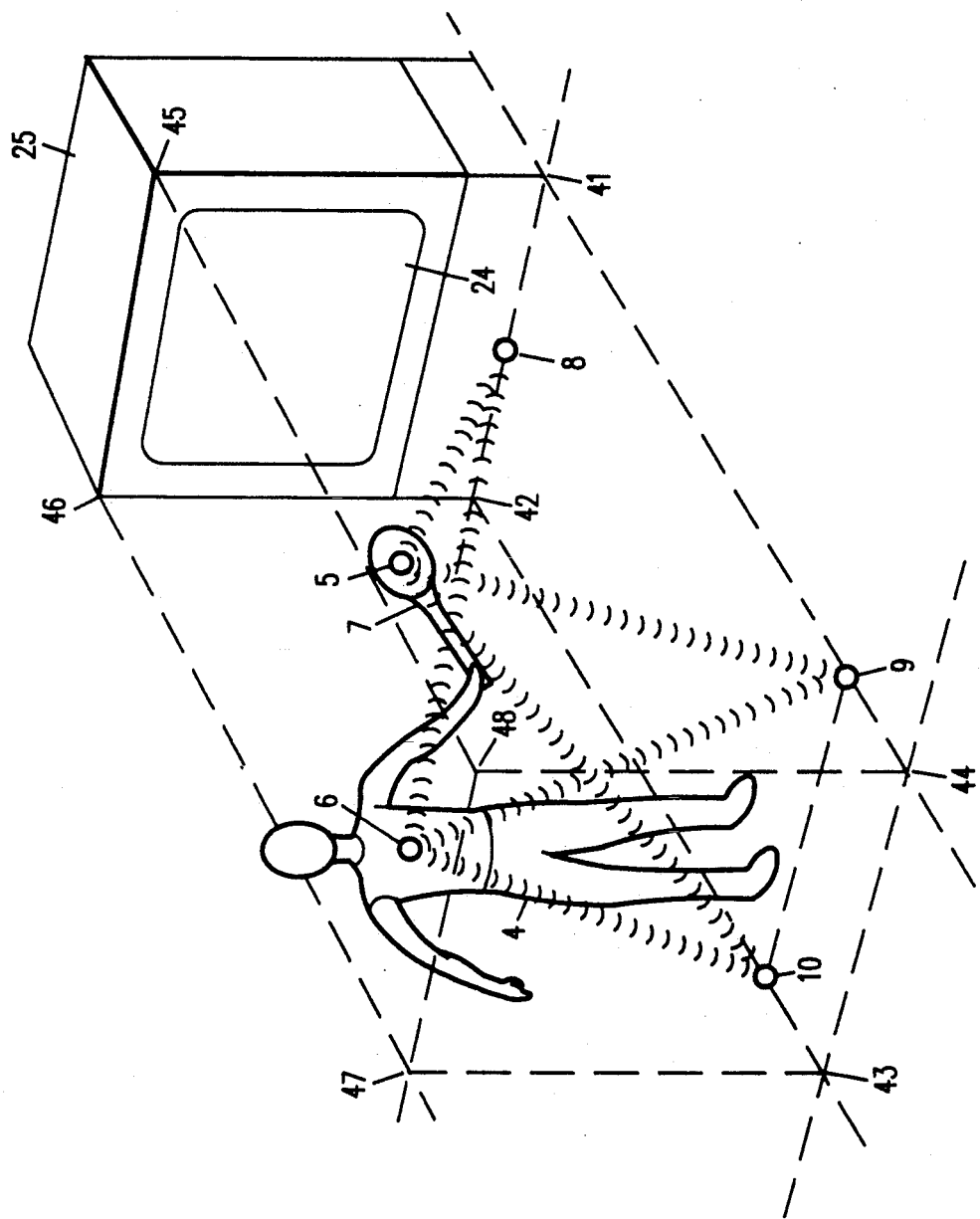
FIG. 4 is a diagram in perspective showing the placement of discrete point microphones in a triangular array with a player and playing instrument having transducers mounted thereon before a video monitor illustrating another embodiment of the present invention.
Figure 5:
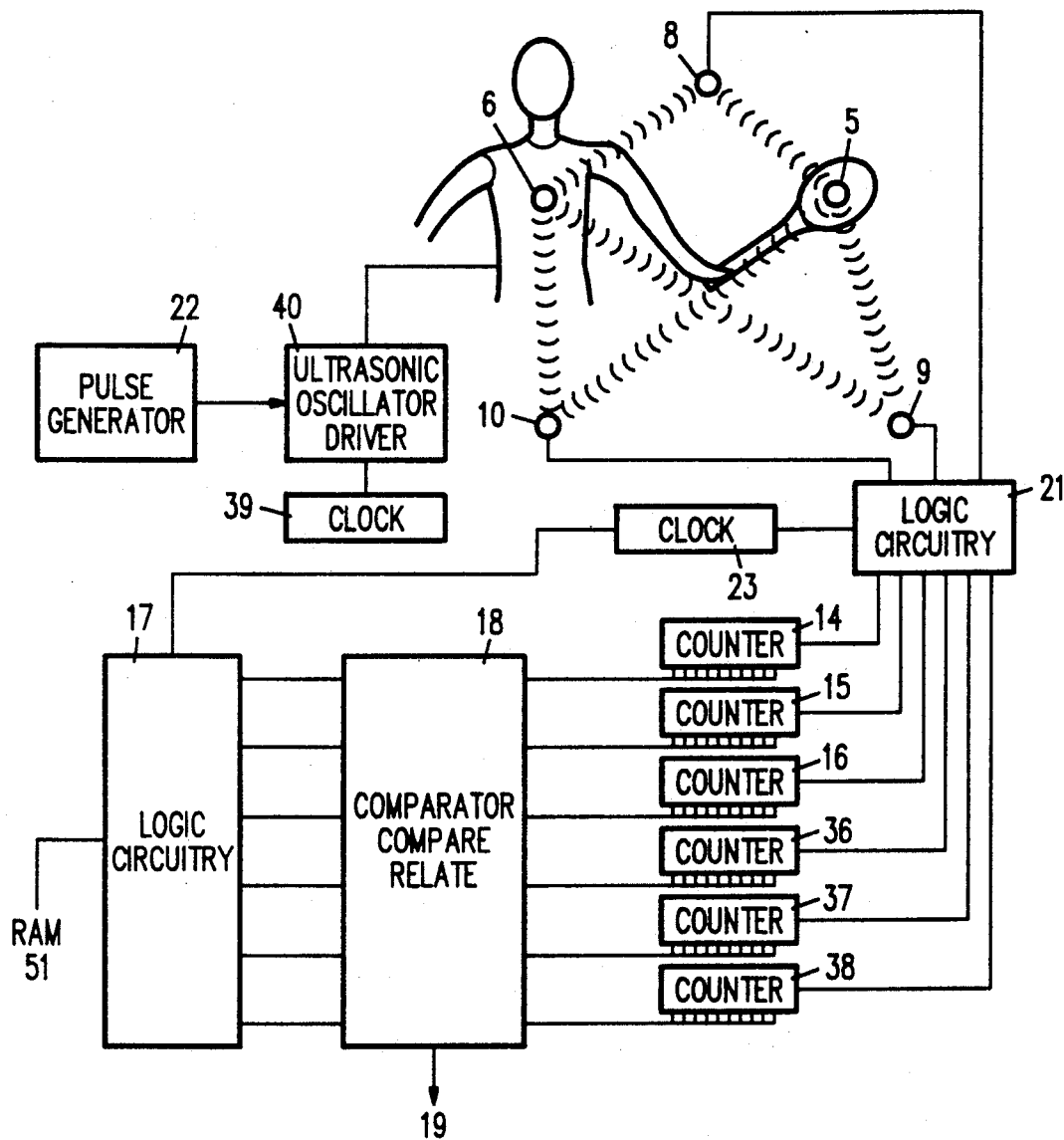
FIG. 5 is a functional block diagram of an alternate circuit of FIG. 1 implementing the system shown in FIG. 6.

Referring now to FIGS. 4 and 5, a system and associated circuitry for improved interactive dramatics between a player and displayed animated action sequences is shown. In FIG. 4 a transducer 6 is mounted on the body of player 4 and a transducer 5 is mounted in a glove or playing instrument 7. The player moves in an area whose base on the floor is located by the corners at positions 41-42-43-44 before video monitor 25. Transducers 5 and 6 working with an array of discrete point microphones 8, 9 and 10 provide accurate determination of the three coordinates of the mid-air position of player transducer 6 and playing instrument transducer 5. As shown in FIG. 5 a portable battery operated module that is mounted on the player 4 includes a pulse generator 22 and an ultrasonic oscillator 40 keyed to produce pulses of ultrasonic energy at a fixed repetitive rate. A crystal controlled time base 39 (synchronized with time base 23) synchronizes the frequency, pulse width, and repetitive rate of the pulses. Transducers 5 and 6 each produce a pulse signal differing in pulse width and frequency. Accordingly the portable module produces alternating pulses of two different types, one type emitted by transducer 5, and another type emitted by transducer 6. Discrete point microphones 8, 9, and 10 detect the ultrasonic energy emitted by transducers 5 and 6. Logic circuitry 21 recognizes the designation of each alternating type pulse by the pulse width and frequency. Accordingly, logic circuitry 21 divides the pulse signals from the microphones 8, 9, and 10 to become six pulse signals to measure the three coordinates for each transducer 5 and 6 positions. Counters 14, 15, 16, 36, 37, 38 convert the pulse data to digital form to be compared by comparator 18 to digitally coded animation location data corresponding to the animated display on the monitor 25 at a (time) frame.

The means of measuring the speed of the player transducer 6 and the playing instrument transducer 5 is based on measuring the velocity of the transducers 5, 6 relative to the receiving microphones 8, 9 and 10.

Figure 6:
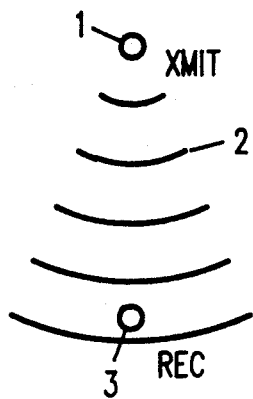
FIG. 6 is a conceptual diagram of the transmission of pulse waves to a single-point receiver by an ultrasonic transponder.
Figure 7:
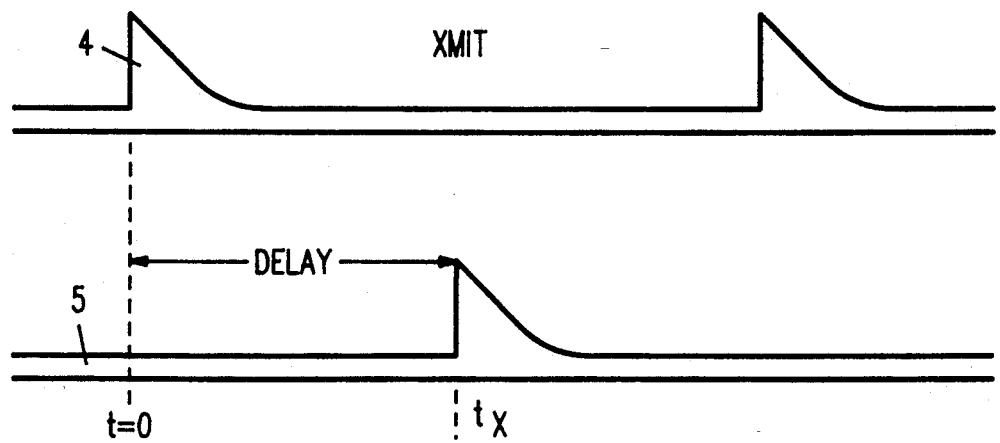
FIG. 7 is a timing diagram of ultrasonic pulses transmitted and received.

Various well-known means of ultrasonic measurement may be used according to the game needs, distances, and vector geometry. FIG. 6 shows an ultrasonic transponder XMIT 1 which transmits audio waves or pulses 2 in response to an electrical signal. These are received by a single-point microphone REC 3. FIG. 7 shows these pulses transmitted in position 4 and received at position 5. To avoid problems with ambiguity, the transmit pulses, must be spaced in time farther apart than the longest distance of interest to be measured. Alternatively, the receiving microphone REC 3 may be gated. A clock or digital counter is initiated by the transmit pulse. When the leading edge of the received signal is detected, the counter is stopped. The time "tx" can be converted to distance when the velocity of sound in the medium is used as a scale factor. This process is simple if it occurs in one plane, if point receivers and transmitters are used and there are no reflections. An additional measurement to determine relative motion between the transmitter and the receiver can be made using the Doppler effect. The Doppler effect is determined by measuring the frequency of the received pulses and comparing this frequency to the frequency of the transmitted pulses. The change in frequency between the transmitted pulse and the received pulse is a measure of the velocity of the transmitter relative to the receiver, and is a factor in determining the velocities of the transmitter 5 mounted on the playing instrument 7 and the transmitter 6 mounted on the player's body 4.

There are two ways to determine velocity from the invention system: A) change in position divided by time interval between two measurements; and B) the Doppler effect. As the measurement does not have to be precise for game playing, it will be easier to use the Doppler effect. The Doppler effect provides a measurement only of the component of velocity in the direction of a line between the object or transmitter and the sensor. To calculate the total velocity, three sensors in three coordinates are used and the vectors added. For the speed measurements of the system, it may be sufficient to use just the measurement of one coordinate.

The movement of the player transducer 6 and the player instrument transducer 5 shown FIGS. 4 and 5 is in paths of action and directions that are calculated from the progressing frames of positions determined by the coordinates of the transducers 5 and 6. A three dimensional playing area before monitor 25 of FIG. 4 has a base 41-42-43-44 and a top 45-46-47-48 and may be divided into area zones. Also a zone cuing area may be calculated around the animated character or object displayed on the face of the monitor screen 24 or at the projected mid-air position of animated foreshortened perspective actions. Accordingly, the velocity, mid-air position, monitor screen 24 contact position, path of action, direction of path of action, zone position relative to the video monitor, and zone position relative to the displayed animated character are position measurements of the player 4 and playing instrument 7 that are compared to position and schedule data relative to the animation display which is coded in the animation production or supplied by program memory cartridge 26 for access from memory storage RAM 51 of FIG. 1 to generate a sequence of digital commands to direct the animation display. This embodiment of the present invention increases the degree of animated character dramatic sensitivity to the player actions and thus creates a sense of reality. Accordingly, if the player approaches the screen, the animated characters may react and run away or attack. A player moving away from the screen may cause animated characters to appear. If the player moves in any direction the animated character may appear to follow. A quick move by the player may frighten the animated characters. Any move by the player may cause a reaction in the animation. The movement of the player into area zones related to the monitor, or related to the animation character and display, may cause a reaction, or schedule or reactions, by the animated character.

The embodiment described extends the scope of game action. Tennis or Ping-Pong games as contemplated in U.S. Pat. No. 4,695,953 are improved by the realistic and more sensitive reactions of the animated character opponent to the player moves, direction, area position, and speed.

Figure 8:
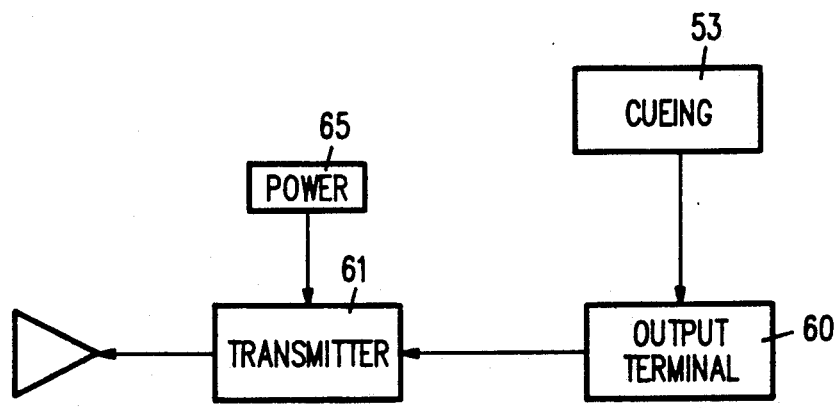
FIG. 8 is a conceptual block diagram of an output terminal of the system shown in FIG. 1 that broadcasts digital control data to remote modular apparatus.
Figure 9:
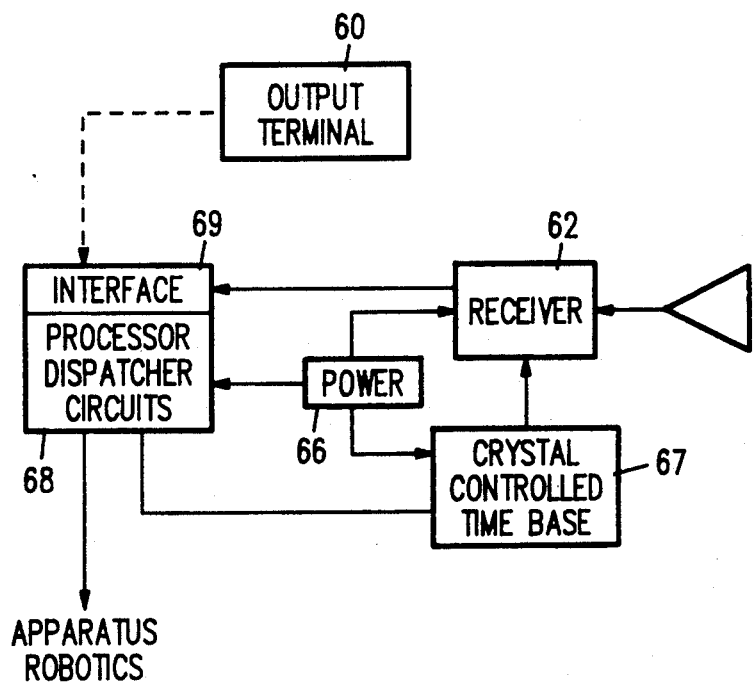
FIG. 9 is a conceptual block diagram of an input terminal of remote modular apparatus that receives transmissions from the system output terminal shown in FIG. 8.

Referring now to FIGS. 1, 8 and 9, the system of FIG. 1 provides the capability of controlling the action of remote vehicles and other apparatus based on feedback of actions of such remote apparatus. FIG. 8 shows a functional block diagram wherein output terminal 60 receives commands and other data for remote modular apparatus or robotics and transmits the data in digital or analog form via transmitter 61 to such apparatus. As shown in FIG. 9, remote modular apparatus includes input circuitry for receiving commands and other data via a receiver 62 which is controlled by a crystal controlled time base 67. Command and data signals are coupled through interface 69 to allow the use of multiple modules to processor 68 within the remote apparatus to operate the module. Alternatively, output terminal 60 may be directly coupled to interface 69 for relaying command data to interface 69 and hence to processor 68. Commands and other data transmitted to processor 68 are generated by the system circuit shown in FIG. 1 and coupled to the output terminal 60 via cuing unit 53.

An embodiment of a modular apparatus which may be controlled by data from cuing unit 53, is diagrammed as apparatus 7 in FIGS. 10, 11 and 12. Apparatus 7 operates in a coded area before video monitor 25 as shown in FIG. 4. Transducers 5 and 6 are shown installed at extremities of apparatus 7. Transducers 5 and 6 emit ultrasonic pulses provided by pulse generator 22 and ultrasonic oscillator driver 40 according to a crystal controlled time base 39. As previously described, microphones 8,9, and 10 receive pulses and the position coordinates are measured in the same manner as in the description of the operation of FIG. 3. As we have described the system function in relation to FIGS. 2, 3, 4 and 5, the determination of the coordinates of the moving transducers 5 and 6 supply the mid-air position, the coded zone area position, the speed and direction of movement of the transducers, and the point on the video screen 24 of FIG. 2 that is the intersection of a projection of a line between the transducers and the screen 24, all of which may be compared to animation display coded data, as described, to effect both the video display multiple track switching and the behavior or restriction of the behavior of apparatus 7 while being manually operated by the trainee or player. The scope of the combinations of the above factors encompasses multiple simulated training or entertainment apparatus controlled before the video screen.

Referring to FIG. 10 the apparatus 7 operating as a module before a theatrical size video screen 24 may be embodied as a simulated vehicle 7 driven by the operator. Transducers 5 and 6 are mounted on the sides of vehicle to register tilt. The vehicle 7 is mounted on a mechanism controlled by animation coded data transmitted as shown in FIGS. 8 and 9, and as described above. The vehicle 7 also moves from side to side according to the inputs generated steering by the operator. The position of the vehicle 7 before the video screen 24 is continuously established by command digital coordinates from coded data determining the distances of transducer 6 to microphones 8,9 and 10 and transducer 5 to microphones 8,9 and 10 to adjust the vehicle 7 to simulate the wheels running on animated racetrack displayed on the screen 24. Accordingly, the vehicle elevates and tilts to fit the displayed animated racetrack and the operator steers the vehicle from side to side on the displayed animated racetrack.

The operator steering of the simulated vehicle can effect the animated display related to the steering in various embodiments. The operator steering of the vehicle is free and unrestricted to steer the vehicle off the racetrack at either side. Simulating reality, the event of such an accident effects both the animation and vehicle. The intrusion of the vehicle into coded areas before the screen triggers an animated reaction including sound effects and the violent shaking of the vehicle.

Another embodiment provides animated obstacles on the oncoming foreshortened perspective animated racetrack that may animate out of the way, or they may not. Defensive driving is required by the driver. If the coordinates of the location of the vehicle 7 match the coded coordinates of the displayed obstacle, at frames of the animation depicting collision, the system effects track switching as previously described.

Referring to FIG. 10, the apparatus vehicle 7 may be steered by the operator to aim at a projected point on the video screen 24, and thus effect the animation aimed at, or effect the animation based on an indication related to the point of aim. FIG. 11 shows a line 1 projected through transducer locations 5 and 6. A line 2 is projected from the center of the distance between transducers 5 and 6, normal to line 1, forward to the video screen surface 24, at point of aim 3. The screen coordinates of the point of aim 3 may be determined by a method using the distance 5-6 as the fixed distance of the hypotenuse of right angle triangles. The method is illustrated in FIGS. 2 and 3 and described in an embodiment of object 7 as a rifle. The added calculation of the projection line 2 at right angles to the projection line used in the rifle embodiment is incorporated in the process. An embodiment example may provide the selection of one of a number of forking routes of the oncoming roadway at a branching point in the animated roadway of a designated frame wherefrom multiple tracks originate depicting multiple routes of the separating road. The animation track of the branching route aimed at by the vehicle is selected by the system for display.

The determination of the point of aim 3 by simulation vehicle 7 on video screen 24 is a process instrumental to an embodiment using a simulated gas pedal effecting the speed of the oncoming perspective foreshortened animated roadway giving the illusion of speed to the vehicle 7. As the gas pedal is pushed to the points of accruement per frame, the mechanism of the pedal effects a truck to a smaller field (in animation production terms) using circuitry for selecting a smaller TV field fraction of the animation production field, then centering and expanding the selected picture so as to occupy the entire raster of the tube. The centers of the successive reduced fields are an aligned series aimed at point 3 on screen 24.

FIG. 12 diagrams object 7 of FIGS. 2 and 3 as a cannon mounted on a tank simulation, as the forward guns in an aircraft, or other weaponry simulation. The simulated craft and weapon is operated to aim at a point 3 on the video screen 24. When triggered the point of aim 3 is determined as described in relation to the rifle embodiment diagrammed in FIGS. 2 and 3. If the aim is correct the displayed animation depicts a simulation of reality at the point of aim 3. When triggered the vehicle 7 reacts with sound effects simulating reality. The process saves ammunition and affords infinite simulated firings and practice to improve skills.

In another example, an amusement park embodiment of tennis or ping pong games as contemplated in U.S. Pat. No. 4,695,953 is played before a theatrical video screen. A moving floor similar to moving belt walks installed in airports may be moved to match corresponding animation pan background moves displayed in the animation. The animation is coded to produce digital commands by the system moving the floor to fit the game or dramatic action of the display. The output terminal 60 of FIG. 8 transmits control commands to the modular apparatus operating the moving floor based on the location of the player and the direction, path, and speed of the game action effecting animation pan background moves.

Toy and amusement devices operated by remote modular apparatus as diagrammed in FIGS. 8 and 9 may be activated and controlled by animation coded data to react to the displayed animation, and may be manually operated simultaneously. Another embodiment may be a toy dog that progresses according to operator control, and also barks or acts in reaction to the displayed animation.

Toys that are confined to an area or that are stationary in location although moving may be installed adjoining the video screen in locations whose coordinates in relation to microphones 8,9 and 10 of FIG. 4 are coded in the system to be compared to coordinates of the player 4 and thus control the toy. Other embodiments may be toys that react to player action and animation action simultaneously. For example, a parrot may speak to the player when approached or comment and squawk about the animation display. Puppets activated by mechanical means may function as an audience reacting to specific player action or animation action or both. Action based on a comparison of player coordinates to environmental coordinates may be activated by the location of the player and the direction, path, and speed of the player's actions.

The present invention contemplates scoring, grading the operator's action and response, timing game action, and recording data by remote modular apparatus. The operational data is relayed from the system by cuing unit 53 of FIG. 1 to output terminal 60 and hence wired or transmitted to remote modular apparatus as diagrammed in FIGS. 8 and 9. There are numerous other embodiments that include scoring and game timing displays and clock devices that show the progress of multiple games, such as tennis. Remote switching devices may turn off or on the lights in a room to match game explosion displays, game disasters, or darken the lights for dramatic effect. Educational embodiments include clocks and displays timing and grading the student response.

While the motion picture display of the present invention has been described as animation, it is understood that live-action motion pictures may be manufactured, produced, shifted by optical printing, retimed and analyzed for the coordinates of the positions of moving objects to parallel the animation production methods of the invention, and thus be operated by the invention apparatus to perform the unique functions herein described. Live-action motion picture frames may be enlarged and printed on animation size paper; then, moving characters may be cut out, put on animation cells (of clear plastic sheets), placed on animation or photographic backgrounds and photographed on motion picture film according to the animator's exposure sheet to parallel the animation method and production coding process of the invention. Computer generated images may be organized and analyzed to determine the coordinates of moving objects to parallel the invention process.

While the invention has been described with reference to preferred means and embodiments, it is understood by those skilled in the art that other means of position detection, such as a light pen, mouse or joystick various modifications, alternate arrangements, different circuits and apparatus that parallel the animation method and production coding and coordinate matching process of the invention are within the scope of the invention performing the unique functions of the invention. Therefore, animation descriptions, circuits specified, and apparatus specified should not be construed as limiting the scope of the invention.

What is claimed is:

1. An interactive video system providing repeated switching of multiple tracks of action sequences displayed on viewing media and for providing remote apparatus command signals derived from said remote apparatus response to displayed action sequences, said video system comprising:

position input means associated with a controllable remote apparatus;

storage means for storing data representing a plurality of randomly selectable tracks of visual image sequences;

display means coupled to said storage means for displaying selected ones of said plurality of tracks of visual image sequences;

control means selecting a next successive one of said tracks of visual image sequences for display on said display means in response to the location of said controllable remote apparatus with respect to selected video images of a currently displayed visual image sequence and for generating control signals for controlling said controllable remote apparatus in response to its location with respect to said selected currently displayed video images; and coupling means coupled to said control means for coupling said control signals to said controllable remote apparatus.

2. An interactive video system as in claim 1 wherein said position input means comprises:

at least one transducer mounted on said remote apparatus for transmitting a first position signal; and detection means coupled to said control means disposed in fixed relationship with said display means for receiving said transmitted first position signal and generating a position signal indicative of the coordinates of the location of said remote apparatus with respect to a selected currently displayed visual image.

3. An interactive video system as in claim 2 wherein said detection means comprises a plurality of discrete point microphones disposed in an array having a fixed relationship with respect to said display means, said first position signal comprising an ultrasonic pulsed signal.

4. An interactive video system as in claim 3 wherein said position input means comprises two ultrasonic transducers mounted in spaced-apart relationship on said controllable remote apparatus, each of said ultrasonic transducers transmitting a pulsed ultrasonic signal having different distinguishing signal characteristics.

5. An interactive video system as in claim 4 wherein each of said pulsed ultrasonic signals comprises a pulse train having different pulse width and pulse repetition rate.

6. An interactive video system as in claim 4 further including calculating means coupled to said detection means and responsive to said transmitted position signals for calculating the respective locations of said transducers and the intersection point of a first line projecting from a second line with said display means with respect to a selected currently displayed video image, said second line projected through both said transducers.

7. An interactive video system as in claim 6 wherein said calculating means is responsive to said transmitted position signals for calculating the intersection point of said second line with said display means with respect to a selected currently displayed video image.

8. An interactive video system as in claim 1 further comprising user input means coupled to said control means and to said coupling means for entering user input instructions and commands controlling said interactive video system and said controllable remote apparatus.

9. An interactive video system as in claim 8 wherein said coupling means comprises transmitter means coupled to said control means and receiver means included in said controllable remote apparatus for coupling said control signals thereto.

10. An interactive video system as in claim 8 wherein said user input means comprises computer means.

* * * * *